(12) United States Patent
Zellmer et al.

(10) Patent No.: US 9,015,993 B2
(45) Date of Patent: Apr. 28, 2015

(54) CONTROL DEVICE FOR OPERATING AN ELECTRIC WINDOW LIFTER

(71) Applicant: Brose Fahrzeugteile GmbH & Co., Hallstadt (DE)

(72) Inventors: René Zellmer, Weidach (DE); Roland Kalb, Rossach (DE)

(73) Assignee: Brose Fahrzeugteile GmbH & Co., KG., Hallstadt, Hallstadt (DE)

( * ) Notice: Subject to any disclaimer, the term of this patent is extended or adjusted under 35 U.S.C. 154(b) by 0 days.

(21) Appl. No.: 14/273,783

(22) Filed: May 9, 2014

(65) Prior Publication Data

US 2014/0245664 A1    Sep. 4, 2014

Related U.S. Application Data

(62) Division of application No. 13/005,912, filed on Jan. 13, 2011, now Pat. No. 8,756,863.

(30) Foreign Application Priority Data

Jan. 26, 2010 (DE) .......................... 10 2010 005 676

(51) Int. Cl.
*E05F 15/02* (2006.01)
*E05F 15/10* (2006.01)
*E05F 15/20* (2006.01)
*E05F 11/52* (2006.01)
*E05F 15/16* (2006.01)
*B60J 1/17* (2006.01)
*B60J 1/18* (2006.01)
*E05F 15/00* (2006.01)

(52) U.S. Cl.
CPC ........... *E05F 15/2023* (2013.01); *E05F 11/525* (2013.01); *E05F 15/0017* (2013.01); *E05F 15/0021* (2013.01); *E05F 15/1684* (2013.01); *E05Y 2900/55* (2013.01); *B60J 1/17* (2013.01); *B60J 1/18* (2013.01)

(58) Field of Classification Search
CPC .. E05Y 2900/55; E05F 15/0017; E05F 15/00; E05F 15/0004; E05F 15/0008; E05F 15/003; E05F 15/08; E05F 15/086; E05F 11/52; E05F 11/382
USPC ......... 49/26, 27, 28, 348, 349, 502, 506, 103; 318/266, 466; 296/146.16

See application file for complete search history.

(56) References Cited

U.S. PATENT DOCUMENTS

| 3,513,374 | A | 5/1970 | Koment |
| 3,581,174 | A | 5/1971 | Hammer |
| 3,670,454 | A | 6/1972 | Gebhard et al. |
| 3,733,532 | A | 5/1973 | Hill |

(Continued)

FOREIGN PATENT DOCUMENTS

DE    102004048017 A1    3/2006

*Primary Examiner* — Katherine Mitchell
*Assistant Examiner* — Shiref Mekhaeil
(74) *Attorney, Agent, or Firm* — Mendelsohn, Drucker & Dunleavy, P.C.; Steve Mendelsohn

(57) ABSTRACT

The invention relates to a control device for carrying out an operating method for an electric window lifter for moving a rear pane (3) in a motor vehicle, in which the rear pane (3) is moved in a lowering direction (−z) along an approximately s-shaped path of movement. In the case of trapping, the movement of the rear pane (3) in the lowering direction (−z) is stopped and the rear pane (3) is moved in the lifting direction (+z).

12 Claims, 6 Drawing Sheets

(56) References Cited

U.S. PATENT DOCUMENTS

| | | |
|---|---|---|
| 3,815,005 A | 6/1974 | Berger |
| 3,816,963 A | 6/1974 | Hartmeyer et al. |
| 3,965,618 A | 6/1976 | Pickles |
| 4,069,616 A | 1/1978 | Doveinis |
| 4,468,596 A | 8/1984 | Kinzl et al. |
| 4,621,223 A | 11/1986 | Murakami et al. |
| 5,459,379 A | 10/1995 | Takeda et al. |
| 5,872,436 A | 2/1999 | Bergmann et al. |
| 5,982,124 A | 11/1999 | Wang |
| 6,166,508 A | 12/2000 | Kalb |
| 6,426,604 B1 | 7/2002 | Ito et al. |
| 6,472,836 B1 | 10/2002 | Uebelein et al. |
| 6,701,673 B1 | 3/2004 | Kessler et al. |
| 6,710,561 B2 | 3/2004 | Dobson |
| 6,733,065 B2 | 5/2004 | Schindler et al. |
| 6,773,053 B2 | 8/2004 | Richter et al. |
| 8,033,052 B2 | 10/2011 | Kraus et al. |
| 2002/0014871 A1 | 2/2002 | Sugawara |
| 2003/0116994 A1 | 6/2003 | Richtor et al. |
| 2009/0249697 A1 | 10/2009 | Nabetani et al. |
| 2009/0295556 A1 | 12/2009 | Inoue et al. |
| 2010/0319268 A1 | 12/2010 | Bizard |
| 2011/0138693 A1 | 6/2011 | Bozzo et al. |
| 2011/0225894 A1 | 9/2011 | Ewald et al. |
| 2011/0265381 A1 | 11/2011 | Guarnizo |
| 2012/0090240 A1 | 4/2012 | Zellmer |

CONTROL DEVICE FOR OPERATING AN ELECTRIC WINDOW LIFTER

CROSS-REFERENCE TO RELATED APPLICATIONS

This is a divisional of U.S. patent application Ser. No. 13/005,912 filed on Jan. 13, 2011, the teachings of which are incorporated herein by reference in their entirety.

BACKGROUND

1. Field of the Invention

The invention relates to a control device for carrying out an operating method for an electric window lifter for moving a rear pane.

2. Description of the Related Art

Electric window lifters are installed in vehicles and, in response to a control command, move the vehicle panes, in particular also a "rear pane", into a desired position. The term rear pane is understood to mean a side pane in a vehicle, arranged behind what is referred to as the B pillar or adjoining a front pane associated with the driver's or passenger's door on the same side. When closed, a front edge of the rear pane adjoins the B pillar. The term vehicle "B pillar" is generally used to refer to the connecting pillar between the vehicle floor and the vehicle roof, approximately in the middle of a passenger compartment. Many coupes or cabriolets do not have a B pillar. In the case of such vehicles without a B pillar, the front edge of the rear pane adjoins the rear edge of a front pane, with a sealing lip generally being fitted on the front edge.

Especially in the case of cabrios and coupes, path-guided window lifters are therefore used. This is because the restriction on installation space due to the rear wheel housing makes it necessary to pivot the rear pane about the horizontal transverse direction of the vehicle (y direction) as said pane is lowered. Thus, the rear pane is not moved in a straight line but substantially on an s-shaped path. In order to implement such a pivoting operation of the window pane, a first and a second guide rail are provided, each running along a curved path, at least in sections. Also provided is a driver, which can be moved in a direction of movement which is substantially vertical (z direction) overall by means of the first and the second guide rail. The driver serves to connect the window pane to be moved to the window lifter. A window lifter of this kind is disclosed in German patent application DE 10 2004 048 017 A1, for example.

On the s-shaped path, the front edge of the rear pane approaches the B pillar or the front pane. As the front edge approaches the B pillar or the front pane, parts of the body or objects may be trapped.

SUMMARY

It is the underlying object of the invention to provide a control device for carrying out an operating method for an electric window lifter in which, in the case of trapping, release from trapping is made possible.

With respect to the control device, this object is achieved, according to the invention, by means of the features of claim 1. According to this, an apparatus comprises a control device designed to operate (i) an electric rear window lifter motor for a rear pane and (ii) an electric front window lifter motor for a front pane in a motor vehicle. an operating method for an electric window lifter for moving a rear pane in a motor vehicle is provided, in which the rear pane is moved in a lowering direction along an approximately s-shaped path of movement. In this method, in the case of trapping the movement of the rear pane in the lowering direction is stopped and the rear pane is reversed, i.e. moved in the lifting direction.

The control device according to the invention is independent of the presence of an anti-trap protection system, which is generally activated during the movement of the vehicle pane into the closed position, and of the manner in which a case of trapping is detected. Thus, for example, a case of trapping can be recognized or detected on the basis of a change in the drive or motor current, in particular a rise in the current, or a change in the rotation speed, in particular a drop in the rotation speed, or by the evaluation of a sensor signal from a trap sensor.

According to an advantageous development, in the case of trapping the front side pane (front pane) on the same side as the rear pane, i.e. that on the same side of the vehicle (driver or passenger side), is held in position at the same time as the rear pane is reversed, and operation of a window lifter for the front pane is blocked. Holding and blocking the front pane prevents damage/injury occurring due to the rear pane being moved along a trapped object, especially part of the body.

BRIEF DESCRIPTION OF THE DRAWINGS

An illustrative embodiment of the invention will be explained in greater detail below with reference to a drawing, in which.

In all the figures, corresponding parts and variables are provided with the same reference signs in all cases.

DETAILED DESCRIPTION

Figure 1:
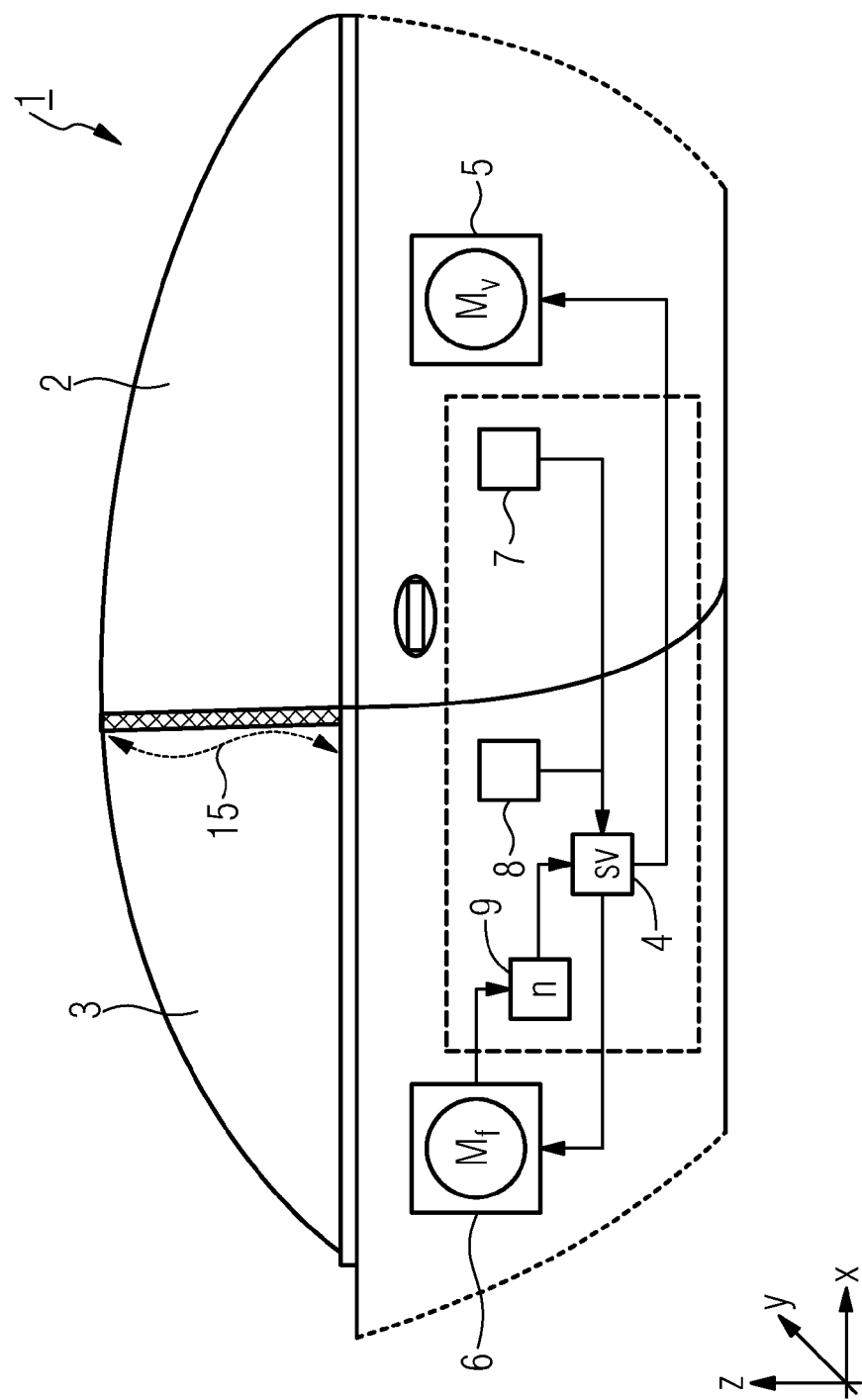
FIG. 1 shows one portion of a side part of a motor vehicle with a front pane and a rear pane and, in schematic representation, a control device for a rear window lifter motor and a front window lifter motor.

FIG. 1 shows a side part 1 of a motor vehicle with a movable front pane 2 and a movable rear pane 3 and, in schematic representation, a control device 4 for operating a front window lifter motor 5 and a rear window lifter motor 6. In this case, a front window lift button 7 and a rear window lift button 8 are connected to the control device 4. The front and rear window lifter motors 5, 6 are furthermore connected to the control device 4. A rotation speed monitor 9 is connected to the rear window lifter motor 6 and to the control device 4.

When the front or rear window lift button 7, 8 is actuated, the front or rear window lifter motor 5, 6 is operated by the control device 4. In this case, the front pane 2 or rear pane 3 is moved in accordance with a button command. During the movement of the rear pane 3, the rotation speed monitor 9 records the rotation speed n of the rear window lifter motor 6, and the control device 4 analyzes the rotation speed n in order to detect a case of trapping.

Figure 2:
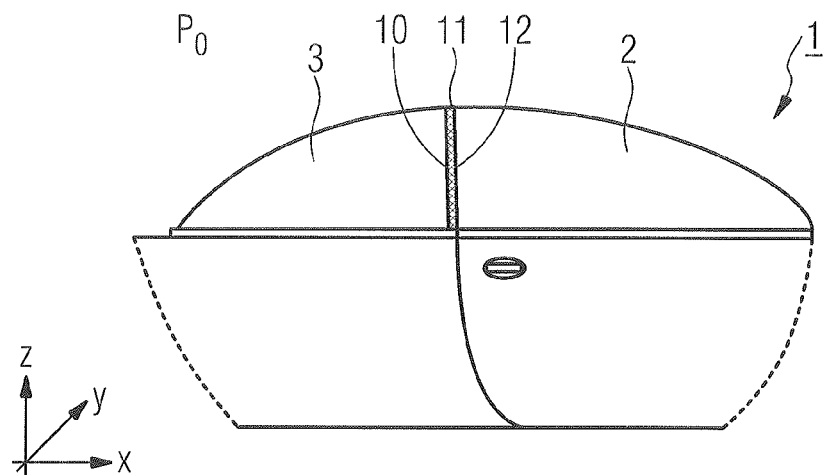
FIG. 2 shows the side part of the motor vehicle with the front pane and the rear pane in a closed position.

FIG. 2 shows the side part 1 of the motor vehicle with the front pane 2 in the closed state. Like the front pane 2, the rear pane 3 is in a closed position $P_0$ in the closed state. In the closed position $P_0$, a front edge 10 of the rear pane 3 adjoins the rear edge 12 of the front pane 2 by means of a fitted sealing lip 11.

In this case, the front edge 10 and the rear edge 12 are oriented horizontally with respect to the z axis, which is based on the typical vehicle coordinate system. The adjoining position of the edges 10, 12 prevents relative wind and rain from penetrating into the passenger compartment.

FIGS. 3 to 6 show the rear pane 3 in various positions as it is moved between the closed position $P_0$ and an open position $P_5$. As the rear pane 3 is moved in the xz plane, a rear pane corner 13 formed at the transition between the rear pane front edge 10 and the rear pane top edge 14 moves along an s-shaped trajectory 15.

Figure 3:
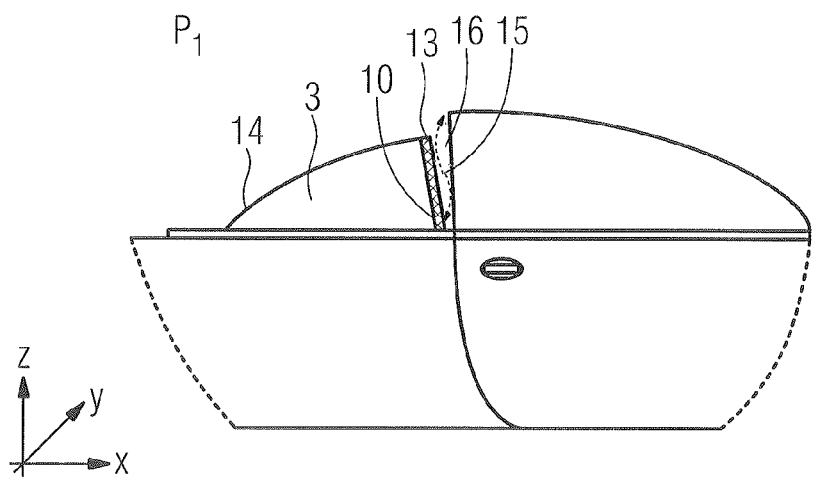
FIGS. 3-6 show the side part of the motor vehicle in accordance with FIG. 2 with the rear pane in various positions.

In FIG. 3, the rear pane 3 is shown in a first position $P_1$. In this position, the rear pane 3 is tilted slightly in the (−)x direction about a y axis and offset in the (−)z lowering direction relative to the closed position $P_0$. In position $P_1$, a gap 16 which increases in the (+)z lifting direction is thus formed between the front edge 10 and the rear edge 12.

Figure 4:
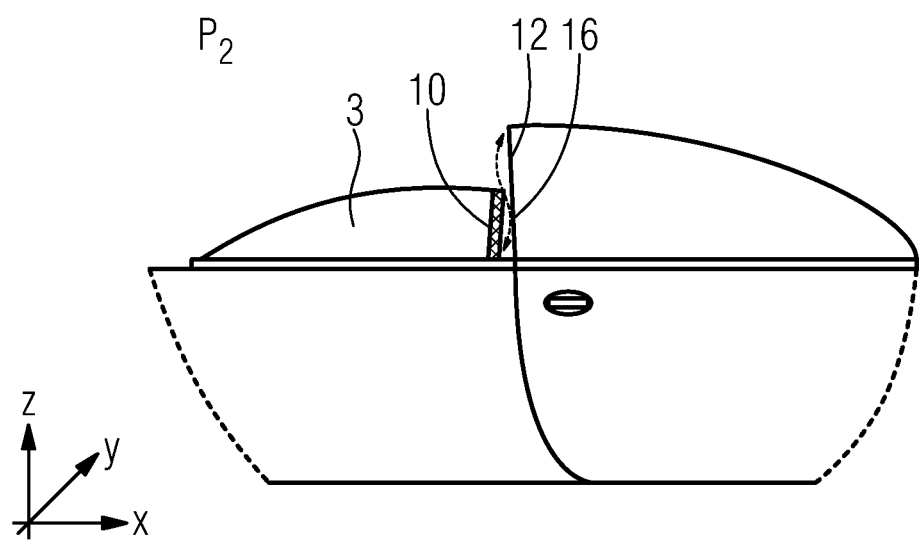

FIG. 4 shows the rear pane 3 in a second position $P_2$, in which the rear pane 3 is at a level approximately half way between the closed position $P_0$ and the open position $P_5$. In position $P_2$, the rear pane 3 is tilted slightly in the (+)x direction in the xz plane, and the front edge 10 and the rear edge 12 form a gap 16 which tapers slightly in the (+)z lifting direction but is open.

Figure 5:
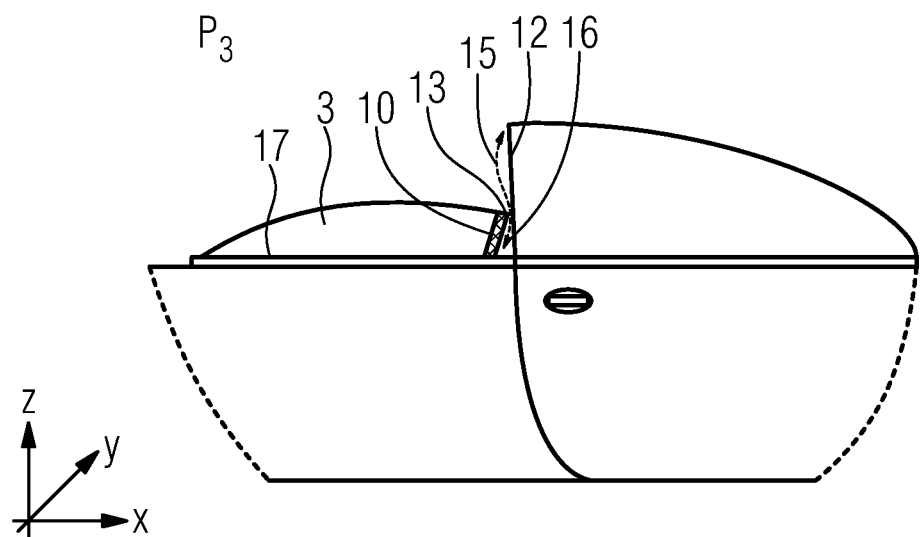

FIG. 5 shows the rear window pane 3 with the rear pane corner 13 in a third position $P_3$, in which it has moved along trajectory 15, with the front edge 10, which is tilted in the (+)x direction, forming with the rear edge 12 a virtually closed gap 16 which tapers in the (+)z lifting direction and, in the (−)z lowering direction, adjoins a door body top edge or a trim strip 17 located there.

Figure 6:
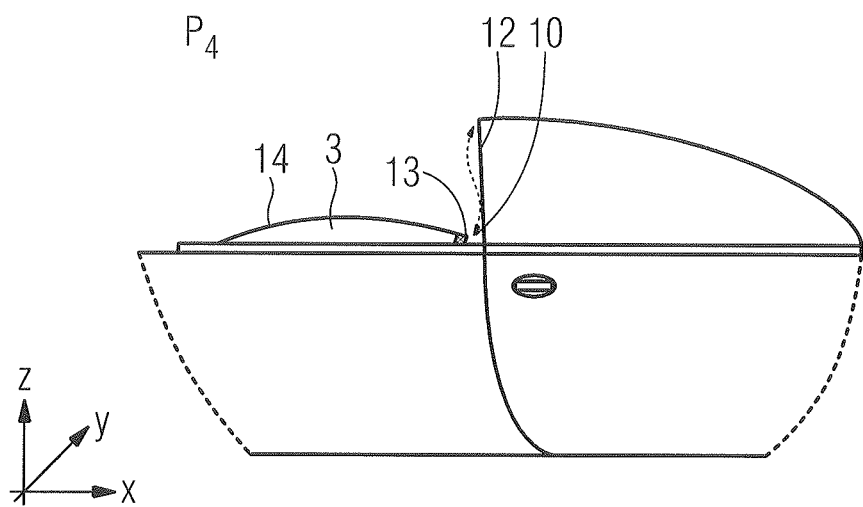

FIG. 6 shows the rear pane 3 in a fourth position $P_4$, in which the rear pane corner 13, a shoulder of the front edge 10 and the front pane top edge 14 project beyond the trim strip 17. In this case, the rear pane corner 13 and the front edge 10 are at a distance from the rear edge 12.

Figure 7:
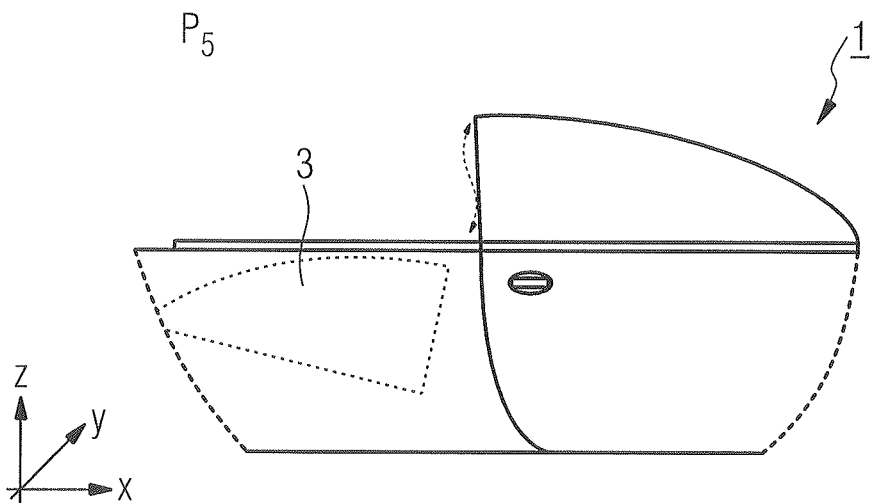
FIG. 7 shows the side part of the motor vehicle in accordance with FIG. 2 with the rear pane in an open position.

FIG. 7 shows schematically the rear pane 3 in the open position $P_5$, in which the rear pane 3 has been moved in the (−)z lowering direction and retracted into the side part 1.

Figure 8:
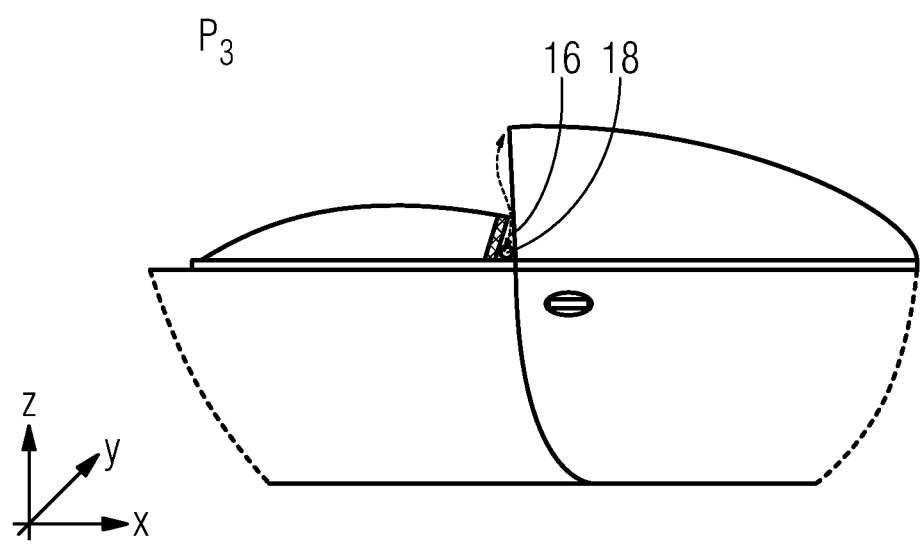
FIG. 8 shows a case of trapping with the rear pane in one position.

FIG. 8 shows a case of trapping in position $P_3$ (in accordance with FIG. 5), in which an object 18 is trapped in the gap 16. The s-shaped movement of the rear pane 3 means that the gap 16 tapers in the (+)z lifting direction in such a way that it is not possible to free the object 18 by movement in a direction in the xz plane.

Figure 9:
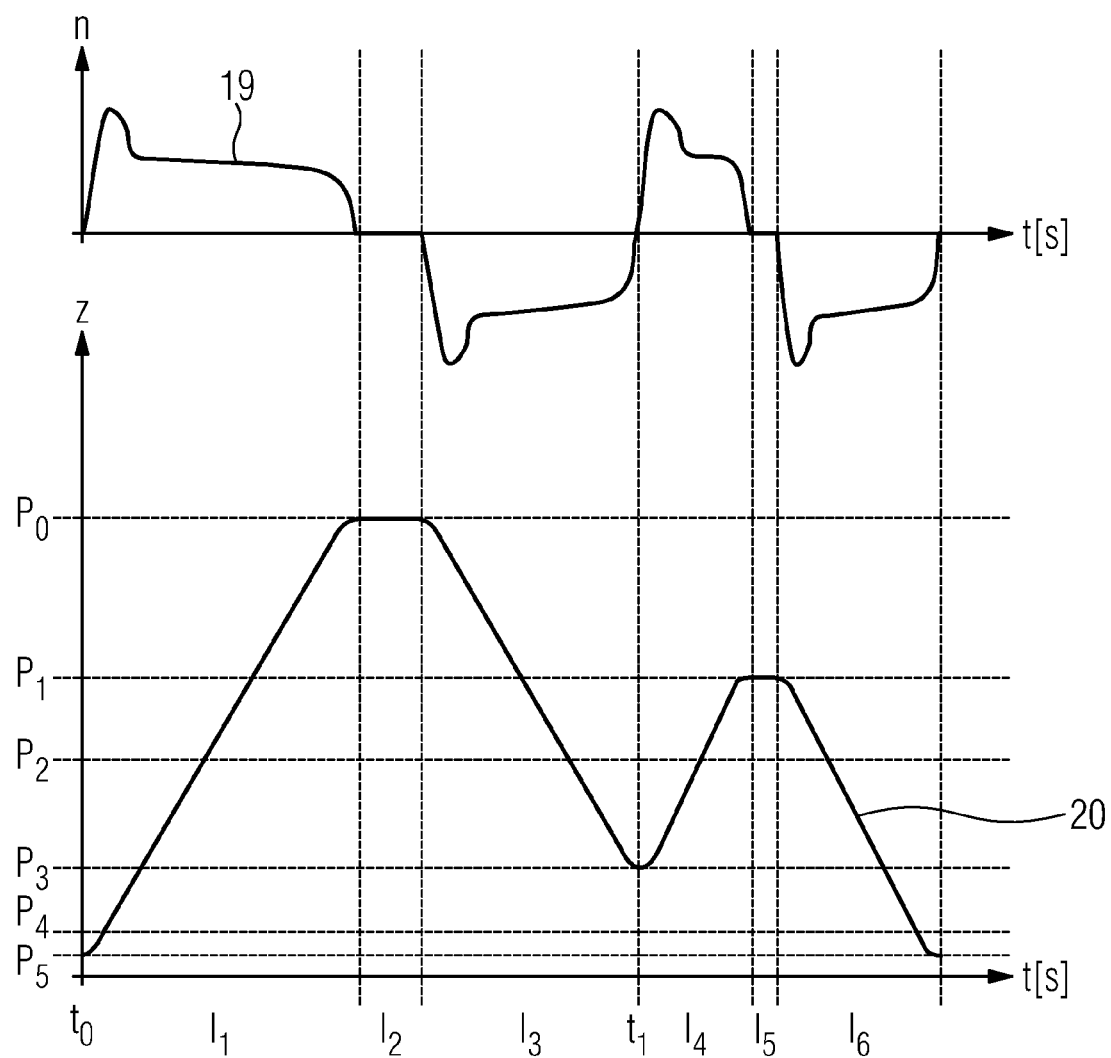
FIG. 9 shows a variation diagram with a rotation speed characteristic of the rear window lifter motor and a position characteristic for the rear pane.

FIG. 9 shows, in a variation diagram, a rotation speed characteristic 19 for the rear window lifter motor 6 in positions $P_1$ to $P_5$ as the rear pane 3 is moved in the xz plane. Here, a position characteristic 20 shows the position of the rear window corner 13 along the z axis. At an initial time $t_0$, the rear pane 3 is in the open position $P_5$. In a first interval $I_1$, the rear pane 3 is moved in the (+)z lifting direction from position $P_5$, via positions $P_4$, $P_3$, $P_2$ and $P_1$, into the closed position $P_0$. Owing to the system slack, an abrupt rise in the rotation speed n of the rear window lifter motor 6 at the beginning of the first interval $I_1$, with a subsequent rapid drop merging into a normal rotation speed range, is observed. Toward the end of the first interval $I_1$, the approach to the closed position $P_0$ is associated with a drop in the rotation speed n. The first interval $I_1$ ends with the rear window 3 in the closed position $P_0$, and the rear window lifter motor 6 stops.

In a second interval $I_2$, the rear pane 3 remains in the closed position $P_0$. In this case, the rotation speed n=0. In a third interval $I_3$, the rear pane 3 is moved in the (−)z lowering direction. Owing to the system slack, the magnitude of the rotation speed n initially rises abruptly but then decreases as the window lifter mechanism between the rear window lifter motor 6 and the rear pane 3 comes into nonpositive engagement. As the rear pane 3 is moved in the (−)z lowering direction, the rear window lifter motor 6 moves in the opposite direction, this being illustrated by a negative rotation speed n.

At time $t_1$, the case of trapping illustrated in FIG. 8 occurs. In this case, the rotation speed (−)n falls rapidly owing to the trapped object 18. The control device 4 recognizes the case of trapping from the drop in rotation speed detected by means of the rotation speed monitor 9 and stops the rear window lifter motor 6. At the same time, the front window lifter motor 5 is switched to a holding state, in which the front pane 2 stops and can no longer be moved. In the case of trapping, the control device 4 switches over the rear window lifter motor 6 immediately in such a way that the rear pane 3 is moved into position $P_1$ in accordance with FIG. 3, as illustrated in a fourth interval $I_4$.

In a fifth interval $I_5$, the rear pane 3 remains in position $P_1$ to enable the trapped object 18 to be freed. Position $P_1$ is advantageous since the gap 16 between the front edge 10 and the rear edge 12 is widened in the (+)z lifting direction. This simplifies the freeing of the trapped object 18. Once the object 18 has been freed, the rear pane 3 is moved into the open position $P_5$ in a sixth interval $I_6$.

The invention claimed is:

1. An apparatus comprising a control device for carrying out an operating method for (i) an electric rear window lifter for moving a rear pane and (ii) an electric front window lifter for moving a front pane in a motor vehicle, wherein:
   the control device is configured to control the electric rear window lifter to move the rear pane in a rear-pane lowering direction;
   the control device is configured to detect trapping of a body part or other object between the rear pane and the front pane, while the electric rear window lifter is moving the rear pane in the rear-pane lowering direction;
   the control device is configured, upon detecting the trapping of the body part or the other object, to automatically move the rear pane in a rear-pane lifting direction to a safety position that eliminates the case of trapping, while preventing movement of the front pane, and
   the control device is configured, upon reaching the safety position, to automatically hold the rear pane at the safety position, wherein:
   a corner of the rear pane moves along a curved trajectory when moved in the rear-pane lowering direction from a closed position to an open position, forming a gap between the rear pane and the front pane at intermediate positions;
   the case of trapping occurs at a trapping position wherein the gap is substantially closed in a plane of movement of the rear pane;
   at the safety position, the gap is open in the plane of movement of the rear pane; and
   the safety position is an intermediate position between the closed position and the open position.

2. The apparatus of claim 1, wherein the curved trajectory has an s shape in the plane of movement of the rear pane.

3. The apparatus of claim 1, wherein, in the case of trapping, the control device prevents movement of the front pane by blocking operation of the electric front window lifter.

4. The apparatus of claim 1, further comprising:
   a rotation speed monitor of the vehicle determining rotation speed of the electric rear window lifter, wherein the control device is configured to detect the case of trapping based on the rotation speed of the electric rear window lifter motor determined by the rotation speed monitor.

5. The apparatus of claim 1, wherein the apparatus is the control device.

6. The apparatus of claim 1, wherein the apparatus is the motor vehicle.

7. An apparatus comprising a control device configured to operate (i) an electric rear window lifter motor for a rear pane and (ii) an electric front window lifter motor for a front pane in a motor vehicle, wherein:

the control device is configured to activate, prior to detection of trapping of a body part or other object, the electric rear window lifter motor to move the rear pane in a rear-pane lowering direction;

the control device is configured to detect the trapping of the body part or the other object between the rear pane and the front pane, while the electric rear window lifter motor is moving the rear pane in the rear-pane lowering direction;

the control device is configured to automatically move, after detecting the trapping of the body part or the other object, the rear pane in a rear-pane lifting direction to a safety position that eliminates the case of trapping, while preventing movement of the front pane; and the control device is configured, upon reaching the safety position, to automatically hold the rear pane at the safety position, wherein:

a corner of the rear pane moves along a curved trajectory when moved in the rear-pane lowering direction from a closed position to an open position, forming a gap between the rear pane and the front pane at intermediate positions;

the case of trapping occurs at a trapping position wherein the gap is substantially closed in a plane of movement of the rear pane;

at the safety position, the gap is open in the plane of movement of the rear pane; and the safety position is an intermediate position between the closed position and the open position.

8. The apparatus of claim 7, wherein the curved trajectory has an s shape in the plane of movement of the rear pane.

9. The apparatus of claim 7, wherein, in the case of trapping, the control device prevents movement of the front pane by blocking operation of the electric front window lifter motor.

10. The apparatus of claim 7, further comprising:

a rotation speed monitor that determines rotation speed of the electric rear window lifter motor, wherein the control device detects the case of trapping based on the rotation speed of the electric rear window lifter motor determined by the rotation speed monitor.

11. The apparatus of claim 7, wherein the apparatus is the control device.

12. The apparatus of claim 7, wherein the apparatus is the motor vehicle.

* * * * *